United States Patent [19]

Rasmussen

[11] Patent Number: 5,736,590

[45] Date of Patent: Apr. 7, 1998

[54] PROCESS FOR PRODUCING AN ELECTRICALLY DRIVEN MECHANOCHEMICAL ACTUATOR

[76] Inventor: Lenore Rasmussen, 206 Columbia Common, Somerville, N.J. 08876

[21] Appl. No.: 551,858

[22] Filed: Nov. 7, 1995

[51] Int. Cl.[6] ................... A61F 2/48; C08J 3/06
[52] U.S. Cl. ............. 523/113; 523/105; 523/106; 523/300; 623/4; 623/14; 623/24; 901/50; 525/937; 524/916; 204/414
[58] Field of Search ................... 523/105, 106, 523/113, 300; 623/4, 24, 14; 525/937; 204/414; 901/50; 524/916

[56] References Cited

U.S. PATENT DOCUMENTS

| | | | |
|---|---|---|---|
| 4,328,148 | 5/1982 | Kuzma | 523/106 |
| 5,100,933 | 3/1992 | Tanaka | 523/300 |
| 5,311,223 | 5/1994 | Vanderlaan | 351/169 |
| 5,389,222 | 2/1995 | Shahinpeer | 204/300 R |

OTHER PUBLICATIONS

Science, vol. 218, 1982 Tanaka, T., et al. pp. 467–469.
Polym. Preprint. 1989 Shiga., T., et al vol. 3(1) pp. 310–314.
PolymerGels, 1991 Shiga, T., et al. Plymon Press, NY, pp. 237–246 Edited by D. DeRossi, et al.
C & EN, vol. 67(17) 1989 Shiga, T. (cited in) pp. 39–40.
Adv. Polym. Sci. 1987 Osada, Y. vol. 82, pp. 3–46.
Chem. Soc. Japan, 1985 Osada, Y., and Hasebe, M. Chem. Lett. pp. 1285–1288.
C & EN, vol. 68(2) 1990 Osada, Y. (cited in) pp. 30–31.
Adv. Mater. 1991 Osada, Y. vol. 3(2) pp. 107–108.
Micromolecules, 1991 Miyano, M. and Osada, Y. vol. 24, pp. 4755–4761.
Micromolecules, 1991 Osada, Y., et al vol. 24, pp. 6582–6587.
Nature, vol. 355, 1992 Osada, Y., et al pp. 242–243.
Proceed. First Internat. Conf. Intell. Mate, Okuzaki, M. and Osada, Y. (1993), p. 305.
Scient. Amer. 1993 Osada, Y. and Ross, Murphy, S.B. pp. 82–87.

*Primary Examiner*—Andrew E. C. Merriam

[57] ABSTRACT

A process for producing an electrically driven mechanochemical actuator comprising:

(a) immersing a mixture of poly(2-hydroxethyl methacrylate) and poly(methacrylic acid) crosslinked with 1,1,1-trimethylol propane trimethacrylate and ethylene glycol dimethacrylate into an aqueous polyelectrolyte solution to form a hydrogel;

(b) applying an electrical field to the hydrogel sufficient to provide buckling, rippling, and contraction of the hydrogel;

(c) terminating application of the electrical field and allowing the hydrogel to relax and return to its original shape;

(d) reapplying the electrical field to the hydrogel sufficient to provide buckling, rippling, and contraction of the hydrogel.

5 Claims, 1 Drawing Sheet

PROCESS FOR PRODUCING AN ELECTRICALLY DRIVEN MECHANOCHEMICAL ACTUATOR

TECHNICAL FIELD

This invention relates to materials that respond to an electric field, specifically to materials that can be used as electrically driven mechanochemical actuators.

BACKGROUND INFORMATION

There has been a great deal of interest in the search for materials that can transfer electrical energy into mechanical energy directly, analogous to our muscles converting electrical and chemical energy into mechanical energy to produce movement. Advances in these endeavors have been achieved around the world, using materials such as polyvinyl alcohol (PVA), ionized polyacrylamide (PAA), poly (acrylic acid)-co-poly(acrylamide), poly(2-acrylamide-2-methyl-1-propanesulfonic acid) (PAMPS), poly(methacrylic acid), poly(styrene sulfonic acid), quarternized poly(4-vinyl pyridinium chloride) and poly(vinylbenzyltrimethyl ammonium chloride).

Toyoichi Tanaka, et al. observed that ionized PAA gels, immersed in a 50% acetone and 50% water mixture, collapsed and physically shrunk, by measured loss of volume, in the presence of an electric field. When the electric field was removed, the collapsed gel swelled to its initial proportions (Toyoichi Tanaka, et al. Science, 218, 467 [1982]). Tanaka, et al. observed phase transitions of cross-linked partially hydrolyzed PAA gels as a function of temperature, solvent, ionic concentration, pH and electric field (U.S. Pat. No. 5,100,933). Very small changes in electric potential across partially hydrolyzed PAA gels produced significant volume changes (U.S. Pat. No. 5,100,933).

Tohru Shiga, et al. found that poly(vinyl alcohol)-co-poly (acrylic acid) gels (Tohru Shiga, et al. Polym. Prepr., 30(1), 310 [1989]) and poly(acrylic acid)-co-poly(acrylamide) gels (Tohru Shiga, et al. Polymer Gels, ed. by D. DeRossi, et al. Plenum Press, New York, N.Y., 237 [1991]) exhibited bending deformation in the presence of an electric field. At the national ACS meeting held in Dallas, Tex. in April 1989, Shiga exhibited a robotic arm with flexible plastic "fingers" composed of PVA mixed with PAA, where the rod-like fingers bent in an electric field. The fingers straightened out again upon reversal of the field polarity (C&EN, 67(17), 39 [1989]).

Yoshihito Osada and Mariko Hasebe found that water swollen PAMPS gels contracted in the presence of an electric field, losing as much as 70% of their weight from loss of water. Gels prepared from polymers and copolymers that contain ionizable groups, such as poly(methacrylic acid), partially hydrolyzed poly(acrylamide), poly(styrene sulfonic acid), quarternized poly(4-vinyl pyridinium chloride) and poly(vinylbenzyltrimethyl ammonium chloride) also exhibited marked contraction in the presence of an electric field, as did gels prepared from proteins such as gelatin and collagen, and gels prepared from polysaccharides such as alginic acid and its salts, ager—ager and gum arabic (Yoshihito Osada, Adv. Polym. Sci., 82, 3 [1987]; Yoshihito Osada and Mariko Hasebe, Chem. Soc. Jap., Chem. Lett., 1285 [1985]). Osada observed that the presence of ionizable groups in the polymer gels was a factor in predicting the response of a material to an electric field. According to Osada, polymer gels containing no ionizable moieties, such as poly(2-hydroxyethyl methacrylate) and starch, showed no contraction in the presence of an electric field (Yoshihito Osada, Adv. Polym. Sci. 82, 3 [1987]). At the PACIFICHEM conference held in December, 1989, Yoshito Osada also demonstrated the use of polymeric materials as an actuator in converting electrical energy to mechanical energy. Two electrodes were embedded into a rod-shaped PVA/PAA gel. Application of an electric current caused the gel to contract, and when attached to a lever, lift small weights of up to 22 g (C&EN, 68(2), 30 [1990]). Using poly(acrylic acid) or PAMPS, Osada developed mechanochemical actuators that "walked" in a looping fashion and a mechanochemical valve membrane that reversibly expanded and contracted its pore size, when exposed to an electric field, in alternate on/off cycles (Yoshihito Osada, Adv. Mater., 3(2), 107 [1991]). Osada, et al. found that by doping crosslinked poly[N-[3-(dimethylamino)propyl] acrylamide] with 7,7,8,8-tetracyanoquinodimethane, materials were produced that could undergo rapid contractions in the presence of an electric field (Mari Miyano and Yoshihito Osada, Macromolecules, 24, 4755 [1991]; Yoshihito Osada, et al. Macromolecules, 24, 6582 [1991]). By exposing a surfactant, n-dodecylpyridinium chloride ($C_{12}PyCl$), to a PAMPS gel, and then applying an electric field, Osada, et al. found that the gel underwent a bending motion (Yoshihito Osada, et al. Nature, 355, 242 [1992]). The $C_{12}PyCl$-exposed PAMPS gel was able to move in a worm-like looping fashion, using alternate on/off electric field cycles (H. Okuzaki and Y. Osada, Proceedings of the First International Conference on Intelligent Materials, ed. by Toshinori Takagi, et al. Technomic Publishing Co., Inc., Lancaster, Pa., 305 [1993]). The work of Osada and other investigators is summarized in the article "Intelligent Gels" (Y. Osada and S. B. Ross-Murphy, Scientific American, 82, May 1993).

DISCLOSURE OF THE INVENTION

The discovery of a class of materials that responds to electrical energy by mechanically changing conformation has been accomplished recently in my laboratory, using materials that comprise soft, flexible, oxygen permeable contact lenses. I have found that these flexible materials, with oxygen permeability (Dk) values of at least $16 \times 10^{-11}$ ($cm^2$/sec)(ml $O_2$/ml×mm Hg) at 35° C., used primarily as soft contact lenses, respond to an electric field, quickly and reproducibly, repeatably. These materials can also move the arms of a small hinged joint closer together, repeatably. The materials that I found to respond most readily to an electric field are ACUVUE™ and SUREVUE™ contact lenses, composed of 2-hydroxyethyl methacrylate and methacrylic acid crosslinked with 1,1,1-trimethylol propane trimethacrylate and ethylene glycol dimethacrylate, manufactured according to U.S. Pat. No. 5,311,223, of Johnson & Johnson Vision Products, Inc., of Jacksonville, Fla. These materials are relatively inexpensive to produce, and have wide implications in this novel capacity. By using these materials as electrically driven mechanochemical acuators, they act, in essence, as artificial muscle. These materials, used as electrically driven mechanochemical actuators, have profound implications in the fields of robotics, prosthetics, implants, and movable toys.

BRIEF DESCRIPTION OF THE DRAWINGS

FIG. 1A depicts a top view of the lens before the application of the 50 V electric field.

FIG. 1B depicts a top view of the lens after 5 minutes of being exposed to the 50 V electric field.

FIG. 2A depicts a top view of the lens before the application of the 50 V electric field.

FIG. 2B depicts a top view of the lens after 1 minute of being exposed to the 50 V electric field.

FIG. 3A depicts a side view of the lens before the application of the 50 V electric field.

FIG. 3B depicts a side view of the lens after 16 minutes of being exposed to the 50 V electric field.

Soft, flexible, oxygen permeable contact lenses, with Dk values of at least $16 \times 10^{-11}$ (cm$^2$/sec)(ml O$_2$/ml×mm Hg) at 35° C., such as the ACUVUE™ and SUREVUE™ contact lenses, composed of 2-hydroxyethyl methacrylate and methacrylic acid crosslinked with 1,1,1-trimethylol propane trimethacryate and ethylene glycol dimethacrylate, manufactured by Johnson & Johnson Vision Products, Inc., of Jacksonville, Fla., have been found to respond quickly to an electric field, and then relax back to their original conformations when the electric field was removed, repeatably. By connecting a soft, flexible, oxygen permeable contact lens to a small hinged joint, and then exposing this to an electric field, the lens moved the two arms of the hinged joint closer together, repeatably. By using these materials as electrically driven mechanochemical acuators, these materials act, in essence, as artificial muscle. The use of these materials in this capacity has profound ramifications in robotics, prosthetics, implants, and movable toys.

DESCRIPTION OF THE PREFERRED EMBODIMENT(S)

This invention is based upon the discovery that the materials comprising soft, flexible, oxygen permeable contact lenses respond to an electric field, quickly and reproducibly. These materials respond by extensive conformation changes in the presence of an electric field, covering a much smaller area. In addition, when a soft, flexible contact lens was connected to a small hinged joint and subsequently exposed to an electric field, the arms of the hinged joint moved closer together, repeatably. In this invention, these materials have performed in a novel capacity as electrically driven mechanochemical acuators.

The apparatus used to test these and other materials was a 50 V EDVOTEK minigel electrophoresis apparatus (model #M12, catalog #502, EDVOTEK, Inc.) The materials being tested were placed in the central, sample area of the electrophoresis apparatus.

Figure 1A:
FIGS. 1A and 1B show a top view of the conformation changes that occur to a water or salt water immersed, soft, oxygen permeable contact lens, when exposed to an electric field.
Figure 1B:

In the water or salt (NaCl) water filled electrophoresis apparatus, the ACUVUE™ and SUREVUE™ contact lenses, both with Dk values of $28 \times 10^{-11}$ (cm$^2$/sec)(ml O$_2$/ml×mm Hg) at 35° C., buckled, rippled and curled upon themselves within 5 minutes of being exposed to the 50 V electric field (FIG. 1B). The SUREVUE™ contact lenses even began changing conformations within 3 minutes of being exposed to the 50 V electric field.

When the electric field was removed, the ACUVUE™ and SUREVUE™ contact lenses relaxed back to their original sizes, shapes and conformations. The relaxation was slow, still somewhat incomplete after 30 minutes. After several hours, however, these materials had relaxed back to their original sizes, shapes and conformations. The same materials were exposed to the 50 V electric field, then allowed to relax, repeatably. During each cycle where the 50 V electric field was on, the ACUVUE™ and SUREVUE™ contact lenses changed conformations extensively and quickly (within 5 minutes), and then relaxed back to their original sizes and conformations during each cycle where the electric field was off, repeatably.

Figure 2A:
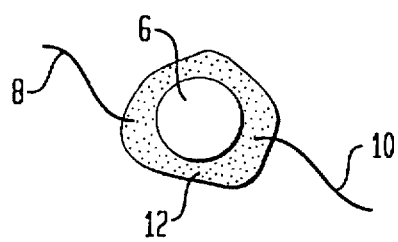
FIGS. 2A and 2B show a top view of the conformation changes that occur to a water or salt water swollen, soft, oxygen permeable contact lens 6, when exposed more directly to an electric field, via platinum wire leads 8 and 10. The lens is surrounded by 5 to 6 drops of water or dilute salt (NaCl) water 12.
Figure 2B:
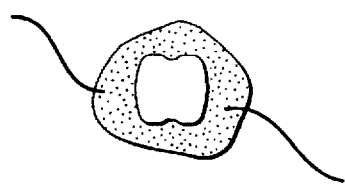

The electrophoresis apparatus was then modified by connecting 0.005 inch, 36 gauge platinum wire to the positive and negative poles of the electrophoresis apparatus (FIGS. 2A and 2B). 5 to 6 drops of water or dilute salt (NaCl) water 12 were placed on the material 6 being tested, which was centered in the sample area of the electrophoresis apparatus, to keep the lens moist and allow currant to flow more directly through the lens. The platinum wire leads 8 and 10 were placed on opposite sides of the material 6 being tested. The ACUVUE™ and SUREVUE™ contact lenses changed conformation immediately, with extreme conformation changes occurring within one minute, when exposed to the 50 V electric field in this fashion. (FIGS. 2A and 2B). When the electric field was removed, these materials relaxed back to their original sizes, shapes and conformations within several hours. The same materials, being exposed more directly to the electric field in this fashion, responded immediately, and then relaxed when the electric field was removed, repeatably.

Figure 3A:
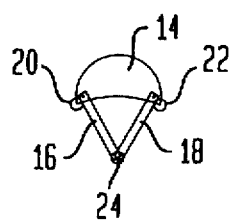
FIGS. 3A and 3B show a side view of the conformation changes that occur to a salt water immersed, soft, oxygen permeable contact lens 14, folded upon itself and connected to a hinge joint, when exposed to an electric field. The contact lens is connected to arms 16 and 18 of the hinge joint by thread 20 and 22. The arms of the joint are connected to each other by thread 24.
Figure 3B:
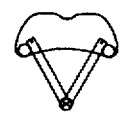

An ACUVUE™ contact lens 14, folded upon itself and connected to a small hinged joint, was found to respond to an electric field, moving arms 16 and 18 of a hinged joint closer together, repeatably. The hinged joint was composed of two small plastic polyethylene arms 16 and 18, both 2 mm by 13 mm, with a small hole near all the ends, connected to each other by a piece of thread 24, and connected to the contact lens by thread 20 and 22. The lens was connected to the plastic arms of the hinge by piercing one part of the lens with a threaded sewing needle, the thread of which was already tied and knotted to one plastic arm of the hinge, and tying and knotting the thread to connect the lens to that arm. Another part of the lens was then pierced with a threaded sewing needle, the thread of which was already tied and knotted to the other plastic arm of the hinge, and tying and knotting the thread to connect the lens to that arm. The lens/hinge was placed in a dilute salt (NaCl) water filled electrophoresis apparatus. After 16 minutes of exposure to the 50 V electric field, the lens had buckled and moved the arms of the hinge closer together by 1.5 mm (FIG. 3B).

Softmate B™ contact lenses, manufactured by Barnes-Hind, Inc., of Sunnydale, Calif., with a Dk value of at least $16 \times 10^{-11}$ (cm$^2$/sec)(ml O$_2$/ml×mm Hg) at 35° C. 16, responded to the 50 V electric field, though not as readily nor as profoundly as the ACUVUE™ and SUREVUE™ contact lenses. All of the hard and semi-hard contact lenses that were tested had no discernible response to the 50 V electric field over extended periods of time.

In summary, materials comprising soft, flexible, oxygen permeable contact lenses have been found to respond quickly to an electric field, (FIGS. 1A and 1B, and FIGS. 2A and 2B), and then relax back to their original conformations when the electric field was removed, repeatably. A soft, flexible, oxygen permeable contact lens, when attached to a small hinged joint, moved the arms of the joint closer together when exposed to an electric field, repeatably (FIG. 3B). A strong, positive correlation has been found, within these flexible materials, between the degree of oxygen permeability and the degree of response of the material to an electric field, both in terms of how quickly the material responds and how dramatically the material deforms. The materials comprising soft contact lenses that responded to an electric field had a Dk value of at least $16 \times 10^{-11}$ (cm$^2$/sec) (ml O$_2$/ml×mm Hg) at 35° C. In this novel capacity, the materials comprising soft, flexible, oxygen permeable contact lens act as electrically driven mechanochemical actuators, and behave, in essence, as artificial muscle.

Materials that are flexible and oxygen permeable, with Dk values of at least $16 \times 10^{-11}$ (cm$^2$/sec)(ml O$_2$/ml×mm Hg) at 35° C., have been found to respond to an electric field, readily and repeatably. A soft, flexible, oxygen permeable contact lens, when attached to a small hinged joint, has been shown to move the arms of the joint closer together when exposed to an electric field, repeatably. A strong, positive correlation has been found, within these flexible materials, between the degree of oxygen permeability and the degree of response of the material to an electric field, both in terms of how quickly the material responds and how dramatically the material deforms. These materials have wide implications in this novel capacity.

By improving the strength and/or toughness of these materials, a stronger, and/or tougher, electrically driven mechanochemical actuator can be made. Similar materials, with Dk values above $16 \times 10^{-11}$ (cm$^2$/sec)(ml O$_2$/ml×mm Hg) at 35° C., can be synthesized. The size of the material and the size of the joint can easily be increased or decreased. These and similar materials could be connected or attached to a variety of hinges or levers. A more sophisticated connection or attachment of the material to a joint can be devised.

By using these materials as electrically driven mechanochemical actuators, they act, in essence, as artificial muscle. The materials comprising soft, flexible, oxygen permeable contact lenses, and improvements thereof, used as electrically driven mechanochemical actuators, have profound ramifications in the fields of robotics, prosthetics, implants, and movable toys.

I claim:

1. A process for producing an electrically driven mechanochemical actuator comprising:

(a) immersing a soft, flexible, oxygen permeable, hydrophilic mixture of poly(2-hydroxethyl methacrylate) and poly(methacrylic acid) crosslinked with 1,1,1-trimethylol propane trimethacrylate and ethylene glycol dimethacrylate into an aqueous polyelectrolyte solution to form a hydrogel;

(b) applying an electrical field to the hydrogel sufficient to provide buckling, rippling, and contraction of the hydrogel;

(c) terminating application of the electrical field and allowing the hydrogel to relax and return to its original shape;

(d) reapplying the electrical field to the hydrogel sufficient to provide buckling, rippling, and contraction of the hydrogel.

2. The process of claim 1 wherein the polyelectrolyte solution is a dilute aqueous sodium chloride solution.

3. The process of claim 1 wherein the mixture of step (a) has an oxygen permeability (Dk) value of about $16 \times 10^{-11}$ (cm$^2$/sec)(ml O$_2$/ml×mmHg) at about 35 degrees C.

4. The process of claim 1 wherein the electrical field is about 50 volts and is applied for about 5 minutes.

5. The product of the process of claim 1.

* * * * *